United States Patent
Chiga

[19]

[11] Patent Number: 5,928,507
[45] Date of Patent: Jul. 27, 1999

[54] FUEL FILTER

[75] Inventor: Antonio Chiga, Dammartin en Goele, France

[73] Assignee: Filtertek, S.A., Plailly, France

[21] Appl. No.: 08/868,449

[22] Filed: Jun. 3, 1997

[30] Foreign Application Priority Data

Jun. 4, 1996 [DE] Germany .......................... 296 09 75 U

[51] Int. Cl.$^6$ .......................... B01D 35/027; F02M 37/22
[52] U.S. Cl. .......................... 210/172; 210/460; 210/461
[58] Field of Search .............................. 210/172, 416.4, 210/460, 461

[56] References Cited

U.S. PATENT DOCUMENTS

| | | |
|---|---|---|
| 1,235,438 | 7/1917 | Chynoweth . |
| 2,381,949 | 8/1945 | Goodloe et al. . |
| 3,826,372 | 7/1974 | Bell . |
| 4,077,887 | 3/1978 | Langvik . |
| 4,159,951 | 7/1979 | Davis . |
| 4,312,753 | 1/1982 | Bell . |
| 4,420,396 | 12/1983 | Yamamoto et al. . |
| 4,561,977 | 12/1985 | Sasaki . |
| 4,617,121 | 10/1986 | Yokoyama . |
| 4,618,422 | 10/1986 | Sasaki . |
| 4,743,370 | 5/1988 | Mizusawa . |
| 4,772,044 | 9/1988 | Booher . |
| 4,783,260 | 11/1988 | Kurihara . |
| 4,851,118 | 7/1989 | Kurihara . |
| 4,874,510 | 10/1989 | Akira et al. . |
| 4,961,850 | 10/1990 | Combest . |
| 5,049,271 | 9/1991 | Cain . |
| 5,084,166 | 1/1992 | Shiraga . |
| 5,169,531 | 12/1992 | Shiraga . |
| 5,547,568 | 8/1996 | Sasaki . |

FOREIGN PATENT DOCUMENTS

| | | |
|---|---|---|
| 0 369 039 A1 | 5/1990 | European Pat. Off. . |
| 0 400 170 A1 | 12/1990 | European Pat. Off. . |
| 0 475 610 B1 | 3/1992 | European Pat. Off. . |
| 0 542 547 B1 | 5/1993 | European Pat. Off. . |
| 814 362 | 9/1951 | Germany . |
| 26 58 358 C3 | 6/1978 | Germany . |
| 34 08 520 A1 | 9/1984 | Germany . |
| 39 14938 C1 | 10/1990 | Germany . |
| 4102474 | 8/1992 | Germany . |
| 295 18 501 U1 | 2/1996 | Germany . |
| 62-41962 | 2/1987 | Japan . |

OTHER PUBLICATIONS

Brochure entitled, "XX Fisita Congress, The Automotive Future," published by Society of Automotive Engineers, Inc., pp. 2.154–2.161, dated May 1984, and translation thereof (25 pages).

*Primary Examiner*—Thomas M. Lithgow
*Attorney, Agent, or Firm*—Steven P. Shurtz; Brinks Hofer Gilson & Lione

[57] ABSTRACT

A fuel filter has a supporting body comprising plastic which is enclosed in a filter fabric and which has a pump connection neck positioned on the top side of the filter. The pump connection neck, with its bottom end extending in close proximity to the bottom of the filter, has an inlet opening. The inlet opening is surrounded by a number of supporting feet. According to the invention, the inlet opening (9) is covered by a plastic disk (12) extending normal to the axis (14) of the pump connection neck (6). The plastic disk (12) is connected with the supporting feet (10) in such a way that the filter fuel flows into the pump connection neck (6) in a radial direction.

20 Claims, 2 Drawing Sheets

FUEL FILTER

FIELD OF THE INVENTION

The invention relates to a fuel filter having a supporting body comprising plastic which is enclosed in a filter fabric, wherein on the top side of the filter there is positioned a pump connection neck which has a bottom end extending close to the bottom of the filter and which has an inlet opening, wherein the inlet opening is surrounded by a plurality of supporting feet.

BACKGROUND OF THE INVENTION

A fuel filter of the above kind, for example, is disclosed in the DE 39 14 938 C1.

Fuel filters of this kind are characterized by a extremely simple construction and are especially useful to be mounted within a fuel tank of motor driven vehicles. The filter function is performed by the filter fabric. The supporting body maintains the distance between the bottom side and the top side of the filter fabric, forming a filter body, because otherwise both sides could partially contact each other, which would decrease the available filter area.

Fuel filters of this kind, in the most cases, are closely mounted to a conveying means, especially a fuel pump, which is also positioned in the fuel tank. In installations of this kind, the filter is connected to the pump connection neck, either directly or by a suction line, and therefore forms a body which can vibrate and transfer vibrations during the operation of the pump or other conveying means. In many cases the transfer of such vibrations creates undesired sounds. In connection with the filters of DE 39 14 938 C1, attempts have been made to reduce such sounds by a special design of the supporting body. However, these attempts were not completely successful.

SUMMARY OF THE INVENTION

A fuel filter has been developed which has reduced the undesired sound during the operation of the filter. The fuel filter comprises a) a supporting body comprising plastic; b) a filter fabric enclosing said supporting body; c) a pump connection neck positioned on the top side of the filter, the pump connection neck having an inlet opening surrounded by a plurality of supporting feet having spaces between them; and d) a plastic plate covering the inlet opening such that filtered fluid flows radially into the inlet of the pump connection neck through spaces between the supporting feet.

According to one aspect of the invention, the inlet opening is completely covered by a plastic disk extending normal to the axis of the pump connection neck. The disk is connected with the bottom ends of the supporting feet such that the filtered fuel can flow into the pump connection neck only in a radial direction.

This feature, which at a first glance looks very simple, ensures a radial flow of the filtered fuel into the pump connection neck. Surprisingly, this results in the advantage that vibrations are not transferred to the fuel tank, which had been the case when the fuel was flowing in a perpendicular or axial direction through the pump connection neck. Therefore, by this invention a substantial reduction of the undesired sounds is achieved.

The preferred plastic disk corresponds in diameter to the cross-section of the suction neck of the pump, is circular, and should extend parallel to the bottom of the filter.

It is preferred that the side of the plastic disk facing the bottom of the filter have a smooth surface so as to prevent the filter fabric from being damaged in this area should the filter fabric contact the plastic disk.

In one embodiment of the invention, the pump connection neck is formed as one monolithic piece with the supporting body and with the supporting feet. Preferably the pump connection neck, too, is in one piece with the plastic disk. As a result, preferably the entire unit is formed as one unitary member.

In another preferred embodiment of the present invention, the pump connection neck is formed as one piece with the supporting body and the supporting feet are formed as one piece with the plastic disk. The separate one-piece feet and disk member is then connected with the pump connection neck. This embodiment avoids the need for complicated undercuts in the molds used to mold the filter parts.

Preferably, this embodiment can be further improved by molding the top ends of the supporting feet in one piece with an annular body which is received in an annular groove in the bottom edge of the pump connection neck.

In the embodiment with separate pieces, the connection of the pump connection neck with the other member is preferably made by glueing or welding, especially by ultrasonic welding.

In an especially preferred embodiment of the present invention, the pump connection neck is insert injection-molded onto the filter fabric.

Examples of the invention are shown in the drawings and in the following detailed description.

DETAILED DESCRIPTION OF THE DRAWINGS AND OF THE PREFERRED EMBODIMENTS

Figure 1:
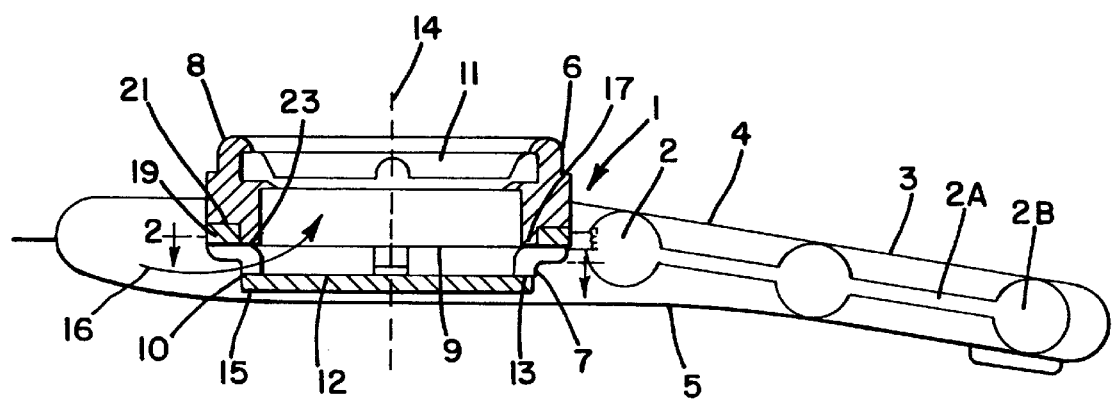
FIG. 1 a schematic side view in cross-section of a preferred embodiment of the fuel filter according to the invention.
Figure 2:
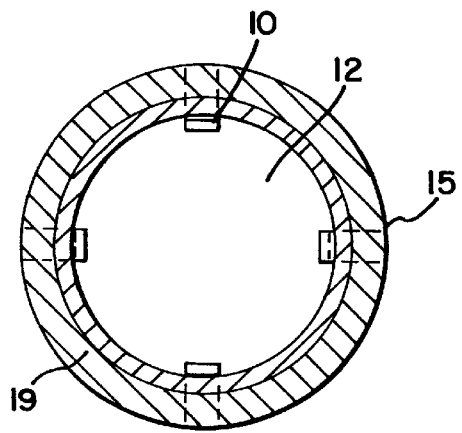
FIG. 2 a cross-sectional view taken along line 2—2 in FIG. 1.

As shown in FIGS. 1 and 2, one preferred fuel filter 1 of the present invention contains a supporting body 2 consisting of plastic. Supporting body 2 preferably has a typical construction consisting of bars 2A having spreader elements 2B. The supporting body 2 is enclosed in a plastic filter fabric envelope 3 which performs the filtration function.

The top side 4 of the filter 1 is provided with a pump connection neck 6 of usual construction. Its bottom end 7 extends closely to the bottom 5 of the filter 1. As shown in FIG. 1, the pump connection neck 6 is preferably in one piece with the supporting body 2 and is preferably directly injection molded onto the filter fabric 3. Details of this kind of construction are described in EP Patent Publication No. 0 400 170 B1, incorporated herein by reference.

The pump connection neck 6 has an inlet opening 9 for the filtered fuel, which is surrounded by a plurality of supporting feet 10. The fuel filter 1 is connected by its pump connection to the suction side of a fuel pump or other conveying means (not shown). The filter and pump are then positioned in the interior of a fuel tank of a motor driven vehicle (not shown). The fuel surrounding the filter fabric 3 reaches the inlet opening 9 via the filter fabric 3. Dirt particles and the like are separated by the filter fabric 3.

According to this first preferred embodiment of the invention, the inlet opening 9 is completely covered by a plastic disk 12 extending normal to the axis 14 of the pump connection neck 6. The disk 2 is connected with the bottom ends 13 of the supporting feet 10. By this measure the axial flow of the fuel from the inlet opening 9 to the suction side 11 is prevented. The filtered fuel therefore exclusively flows radially into the pump connection neck 6 through the spaces between the feet 10. The spaces between the feet 10 are wider than the width of the feet 10. The flow of the fuel is shown by the arrow 16.

As further can be seen from FIG. 1, the plastic disk 12 extends parallel to the bottom of the filter 1. The side of the plastic disk 12 facing the bottom 5 of the filter 1 has a smooth surface.

In the preferred embodiment shown in FIGS. 1 and 2, the supporting feet 10 are performed as a separate one-piece member 15 with the plastic disk 12. The one-piece member 15 is then connected with the pump connection neck 6. The top ends 17 of the supporting feet 10 are connected with an annular body 19. The annular body 19 is received by an annular groove 21 in the bottom edge of the pump connection neck 6 and connected thereto either by glueing or preferably by ultrasonic welding.

In a different embodiment of the invention, however, the entire unit which is enclosed in the filter fabric 3 can be performed as one unitary piece. In this embodiment the pump connection neck 6 with the supporting body 2, the supporting feet 10 and the plastic disk 12 are formed as one monolithic member, which is also preferably directly injection molded onto the filter fabric 3.

Further modifications or alternations of the invention are obvious to the expert in this field and are included in the basic idea of the invention, which is to interrupt an axial flow of the filtered fuel into the pump connection neck 6.

The filter fabric 3 is preferably made from a polyamide, although other polymers that are resistant to fuels and common fuel additives can also be used. The filter fabric could be monofilament or multifilament woven filtration medias; for example, square weaver nylon monofilament; plain, reverse Dutch weave nylon, Saran or polyester monofilament; or twill weave monofilament. The pump connection neck 6, supporting body 2 and disk 12 are preferably polyacetals, although other thermal plastics compatible with fuel and additives may be used.

Figure 3:
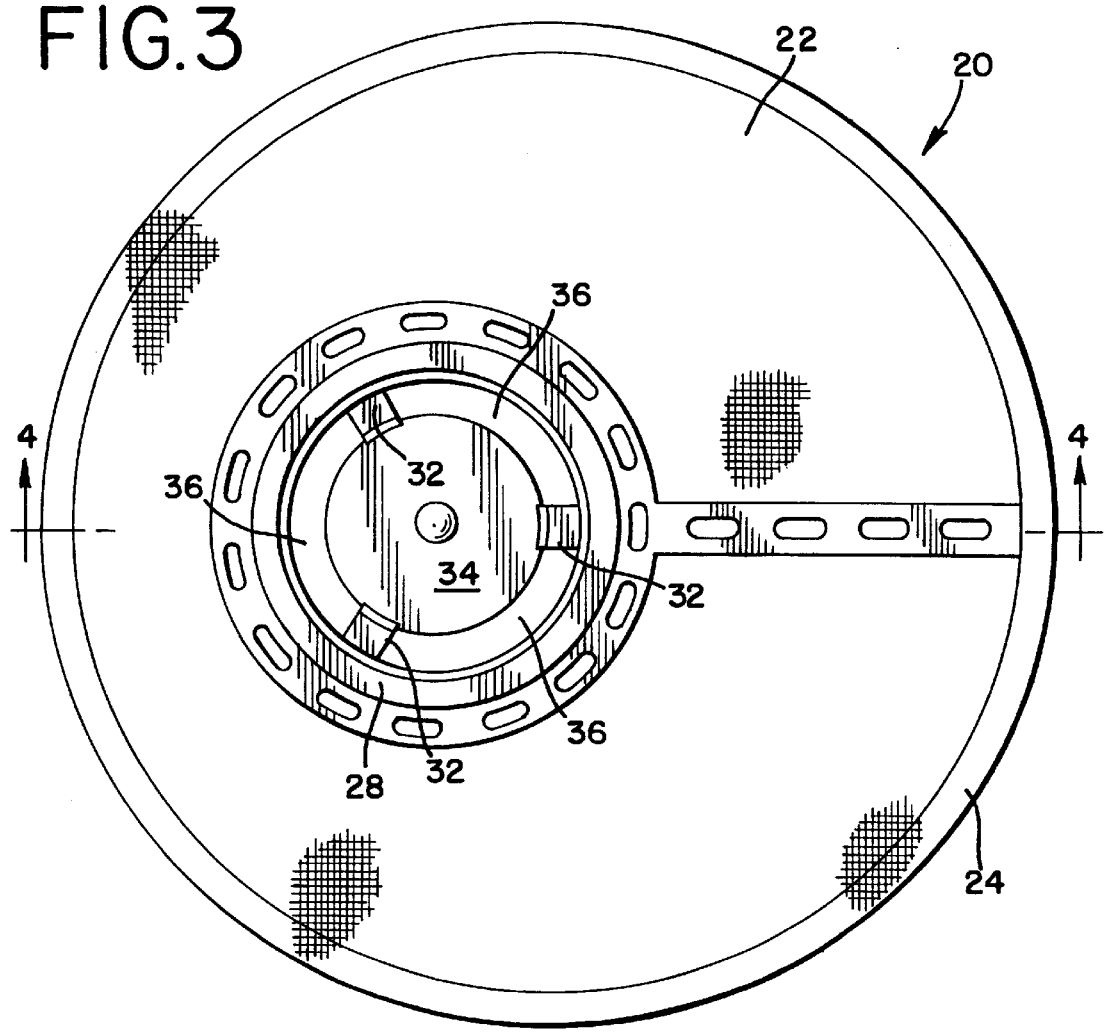
FIG. 3 is a top plan view of second preferred embodiment of the present invention.
Figure 4:
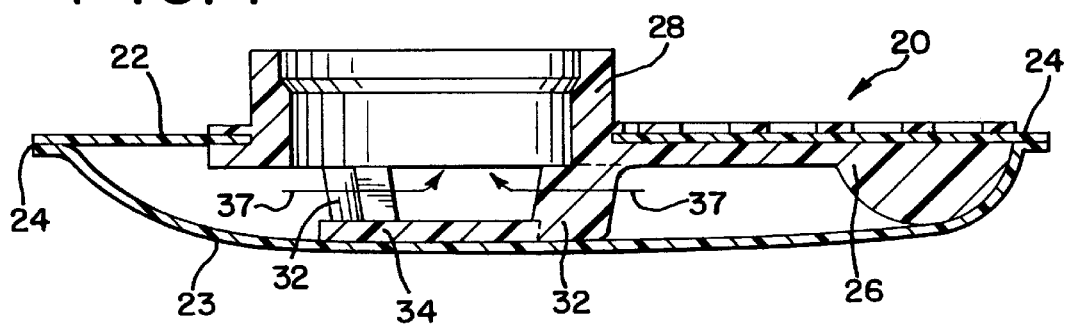
FIG. 4 is a cross-sectional view taken along line 44 of FIG. 3.

A second preferred embodiment of the invention is shown in FIGS. 3 and 4. In this embodiment, the fuel filter 20 is made from top and bottom webs of filtration media 22, 23 sealed together around the filter perimeter 24, and also encloses a plastic supporting body 26 formed as a monolithic unit with the pump connection neck 28 and its supporting feet 32 and the plate 34 attached at the bottom of the feet 32. Also, the filtration media 22 is insert injection molded with the pump connection neck 28. The plate 34 is in the shape of a disk, but is slightly smaller than the diameter of the inlet opening of the pump connection neck. The fluid flow into the pump connection neck, shown by arrows 37, is therefore still predominantly radially, through the spaces 36 between the supporting feet 32.

Filtration media useful in the invention can be of many different types, and is still being evaluated. One preferred filtration media 22 is a depth filtration media which is laminated from four layers. The top, outer layer is a 132 micron woven nylon 6/6 screen. The next layer is a layer of 0.5 ounce/yd$^2$(OSY) spun bonded nylon 6/6. The third layer is of melt blown nylon 6. The fourth layer is 0.5 OSY spun bonded nylon 6/6. The materials are embossed together into a laminate. The melt blown nylon provides most of the filtration performance. The preferred melt blown layer has a Frazier Air Permeability of 110 to 225 ft$^3$/ft$^2$/min., a basis weight of 50–80 grams/m$^2$, and is made of fibers having a diameter of 2–10 micrometers, with a mean diameter of 4 micrometers.

The filter 20 is preferably constructed by punching out a circular hole in the media 22 and insert injection molding the monolithic pump connection neck 28/supporting body 26/supporting feet 32/plate 34 component onto the media. Next a bottom layer 23 of media is welded at perimeter 24 to the media 22 injection molded to the pump connection neck, and excess media trimmed.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

I claim:

1. A fuel filter comprising: a supporting body comprising plastic, which is enclosed in a filter fabric envelope and has a pump connection neck positioned on the top side of the filter, the lower end of the pump connection neck extending in close proximity to the bottom of the filter, said pump connection neck having an inlet opening, wherein the inlet opening is surrounded by a plurality of supporting feet and is completely covered by a plastic disk extending normal to the axis of the pump connection with the bottom ends of the supporting feet, the disk also being within said envelope, such that the filtered fuel can only flow radially into the pump connection neck.

2. The fuel filter according to claim 1, wherein the plastic disk extends parallel to the bottom of the filter.

3. The fuel filter according to claim 1, wherein the side of the plastic disk facing the bottom of the filter has a smooth surface.

4. The fuel filter according to claim 1, wherein the pump connection neck is preformed as one unitary piece with the supporting body and the supporting feet.

5. The fuel filter according to claim 4, wherein the pump connection neck is preformed as one unitary piece with the plastic disk.

6. The fuel filter according to claim 1, wherein the pump connection neck is unitary with the supporting body, and the supporting feet and the plastic disk are formed as a separate unitary member which is fixed to the pump connection neck.

7. The fuel filter according to claim 6, wherein the top ends of the supporting feet are connected in one piece with an annular body, which is received in an annular groove provided in the bottom edge of the pump connection neck.

8. The fuel filter according to claim 6, wherein the connection between the pump connection neck and the separate, unitary member is made by a process selected from the group consisting of gluing and welding.

9. The fuel filter according to claim 1, wherein the pump connection neck is injection molded onto the filter fabric.

10. The fuel filter according to claim 8 wherein the pump connection neck is ultrasonically welded to the separate unitary member.

11. A fuel filter comprising:

a) a supporting body comprising plastic;

b) a pump connection neck positioned on the top side of the filter, the pump connection neck having an inlet opening surrounded by a plurality of supporting feet having spaces between them, the spaces being wider than the feet;

c) a plastic plate covering the inlet opening such that filtered fluid flows radially into the inlet of the pump connection neck through the spaces between the supporting feet; and d) a filter fabric envelope enclosing said supporting body and plastic plate.

12. The fuel filter of claim 11 wherein the plastic plate comprises a disk.

13. The fuel filter of claim 12 wherein the disk is approximately the same size as the inlet opening of the pump connection neck.

14. An in-tank fuel filter which is attached by means of a pump connection neck to an in-tank fuel pump, the filter having a supporting body consisting of plastic which is completely enclosed in a plastic filter fabric, wherein the fuel is sucked through the filter fabric, wherein the pump connection neck is positioned on the top side of the filter, the lower end of which is extending in close proximity to the bottom of the filter, and wherein the pump connection neck has an inlet opening which is surrounded by a plurality of supporting feet, the bottom ends of the supporting feet being connected by a plastic disk inside the filter fabric, the plastic disk extending normal to the axis of the pump connection neck and the inlet opening such that the filtered fuel at least predominantly can flow only radially into the inlet opening of the pump connection neck.

15. The fuel filter of claim 14 wherein the plastic disk completely covers the inlet opening of the pump connection neck.

16. The fuel filter of claim 14 wherein the plastic disk is slightly smaller than the diameter of the inlet opening of the pump connection neck.

17. The fuel filter of claim 14 wherein the pump connection neck is preformed as one unitary piece with the supporting body and the supporting feet.

18. The fuel filter of claim 17 wherein the pump connection neck is preformed as one unitary piece with the plastic disk.

19. The fuel filter of claim 14 wherein the pump connection neck is unitary with the supporting body and the supporting feet, and the plastic disk is formed as a separate unitary member which is fixed to the pump connection neck.

20. The fuel filter of claim 14 wherein the pump connection neck is injection molded onto the filter fabric.

* * * * *